United States Patent [19]

Johnson et al.

[11] Patent Number: 5,121,999

[45] Date of Patent: Jun. 16, 1992

[54] BEARING ASSEMBLY WITH SEAL AND SHIELD

[75] Inventors: James P. Johnson, Sugar Grove; John F. Riggle, Naperville, both of Ill.

[73] Assignee: Emerson Electric Co., St. Louis, Mo.

[21] Appl. No.: 672,928

[22] Filed: Mar. 21, 1991

[51] Int. Cl.⁵ .............................. F16C 33/76
[52] U.S. Cl. ........................ 384/477; 384/482
[58] Field of Search ........... 384/477, 478, 481–486, 384/489

[56] References Cited

U.S. PATENT DOCUMENTS

| | | | |
|---|---|---|---|
| 2,530,052 | 11/1950 | Firth | 384/489 X |
| 2,724,623 | 11/1955 | Robinson et al. | 384/484 |
| 2,733,648 | 2/1956 | Todd | 384/498 X |
| 2,913,289 | 11/1959 | Stevenson | 384/489 |
| 3,141,710 | 7/1964 | Lehman | 384/477 |
| 3,623,782 | 11/1971 | Nakanishi et al. | 384/495 |
| 3,792,912 | 2/1974 | Howe, Jr. et al. | 384/482 |
| 3,869,182 | 3/1975 | Glifberg | 384/486 X |
| 4,392,695 | 7/1983 | Miller | 384/477 |
| 4,659,240 | 4/1987 | Rogus | 384/482 X |
| 5,000,587 | 3/1991 | Hawley | 384/478 |

Primary Examiner—Thomas R. Hannon
Attorney, Agent, or Firm—Aubrey L. Burgess

[57] ABSTRACT

A bearing assembly having inner and outer races with anti-friction elements therebetween and a grease seal at least at one end is provided with a shield between the races for shielding the races, anti-friction elements and grease seal from the entry of dirt, dust and other contaminants.

9 Claims, 2 Drawing Sheets

BEARING ASSEMBLY WITH SEAL AND SHIELD

BACKGROUND

1. Field of Invention

This invention relates to bearing assemblies and more particularly to bearing assemblies constructed to prevent or materially reduce the entry of dust, dirt and other debris into the interior thereof. Such bearing assemblies find particular use in asphalt road pavers where they support the screw of the screw conveyor which distributes asphalt to the ground and wherein asphalt flows axially against and past the bearing.

2. Discussion of Prior Art

U.S. Pat. No. 2,530,052, issued Nov. 14, 1950, teaches a bearing including rubber rings connected to the outer race with a portion wiping the surface of the inner race.

U.S. Pat. No. 2,881,224, issued Nov. 5, 1957, teaches seal means 32 bridging races 18 and 19, to prevent the entrance of foreign material into the interior of the seal 32.

U.S. Pat. No. 2,913,289, issued Nov. 17, 1959, teaches a seal comprising carbon members 32 loose on shaft portion 15, magnet 38 press-fit on sleeve 32 and opposite a member 25 attached thereto, part 27 press-fit into outer race (FIGS. 1 and 2) and sealed by an O-ring to another part of the structure or sealed thereto by an O-ring (FIG. 3), the member 27 extending radially downwardly over member 38.

U.S. Pat. No. 4,392,695, issued Jul. 12, 1983, shows seals 38 and 40 to prevent dust from entering the bearing. The seals are positioned at opposite ends of the bearing and comprise sealant material 46 with felt pads 52 embedded in the sealant material 46 and held in place by washers 54.

THE INVENTION

In the invention described herein, a bearing assembly comprises a housing, an inner race, a spaced outer race, and anti-friction means, such as ball bearings, therebetween. The races are generally cylindrical with the inner race encircling and being connected to a rotatable shaft. The outer race is received in the bearing housing, such as a pillow block, a flange type housing, or other well known housing constructions, and is capable of limited movement to accomodate limited shaft misalignment. The ball bearings between the races are generally evenly spaced by a ball separator or spacer, the construction of which is generally well known. A seal, similar to that shown in U.S. Pat. No. 2,503,052, described above, can be used between the races. In addition, shield means to protect the exterior of the seal from the environmemt and prevent the entry of dirt, dust and other foreign material into the bearing is provided. The shield means is an annular member which is connected to the inner race by one or more screws. The shield means extends radially outwardly to a location at least opposite a portion of the outer race, and is sealed to the outer race by a seal ring. The seal ring is preferably constructed of an anti-friction palstic material, such as TEFLON, so that the shield means can rotate with the inner race, relative to outer race, and yet maintain the protection from the entry of dirt, dust and other foreign materials into the bearing through the bearing seal. Also, the shield means is sealed to the inner race by an elastomeric O-ring.

In another form of the invention, a Belleville washer or spring washer is fixed to the shield which is connected to the rotatable shaft and is preloaded against the bearing outer race, thus rotating relative thereto. The outer periphery of the washer is in sealing contact with the outer race and because of its preload, is self compensating for wear.

In still another form of the invention, a bull-nosed ceramic is connected through an elastomer member to the shield, while a ceramic member with a complementary receiving portion receives the bull-nosed portion of the ceramic member connected to the shield. In assembling the two ceramic members in operating position, a preload force is applied, thus making a substantially fluid tight joint. The latter ceramic member is connected to the outer bearing race by an elastomer member. The ceramic members rotate with respect to one another with the elastomer members not absorb any shock. The ceramic members, because of their shape and co-elastomer construction permit some misalignment of the shaft and the bearing assembly.

The shield means is contoured at its outer extremity so as to not interfere with the bearing housing and the bearing assembly which, as previously stated, can accommodate limited shaft misalignment.

THE DRAWINGS

DETAILED DESCRIPTION OF THE PREFERRED EMBODIMENT

Figure 1:
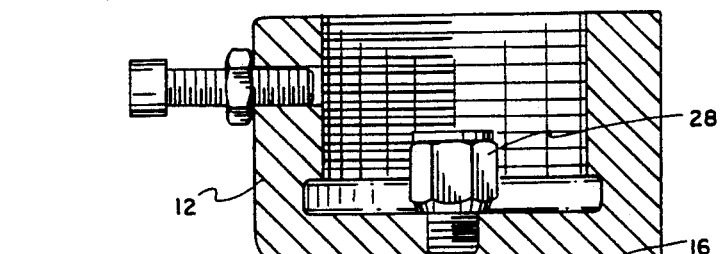
FIG. 1 is a partial sectional view illustrating the preferred embodiment of the invention.

In the accompanying drawings, like reference characters are use to refer to like parts.

FIG. 1 illustrates a bearing assembly comprising a housing 12, an inner race 14 and an outer race 16, the races being spaced from each other and receiving a plurality of anti-friction means, such as balls 18 therebetween. The balls 18 are spaced apart by means of a ball spacer 20 of conventional construction. The inner race is adapted to encircle and be connected to a rotable shaft 22 (shown in broken lines) by means of one or more set screws 24 receivable in threaded openings 26.

A grease fitting 28 (shown schematically) is provided whereby lubricating grease can be introduced into the bearing. To retain the grease in the assembly, one or more grease seals 30 are used. The grease seals 30 each comprise a flinger 32 press-fit into the outer race and a flinger 34 extending from the flinger 32 toward the inner race with wipers 36 therebetween. The wipers can be of an elastomer and the like, having some flexibility to remain in contact with the inner race. At times, the wipers are made of felt, especially when the ernvironment in which the bearing is to be used contains fluid which would adversely affect and damage elastomers.

To prevent the entrance of dirt, dust and other undersirable foreign materials into the bearing, especially when used in a dirty and dusty environment, as of farm equipment and the like, a shield means 38 is used. The shield means 38 is an annular member connected to the inner race by means of one or more set screws 40. The shield means 38 is sealed to the inner race by means of an O-ring 42 which encircles the shaft and to the outer race by a seal ring 44. The seal ring 44 is constructed of an anti-friction material, such as TEFLON and the like. The seal ring 44, because of the material from which it is made, permits the shield means to rotate with the shaft and relative to the outer race, yet insures the continued function of the shield means to protect the bearing seals from the environment and also from being damaged by foreign objects hitting the assembly.

The protective shield means is of simple construction, uses a minimum of parts, yet is effective for the purposes of protecting the bearing assembly from damage due to foreign objects, dirt and dust.

Figure 2:
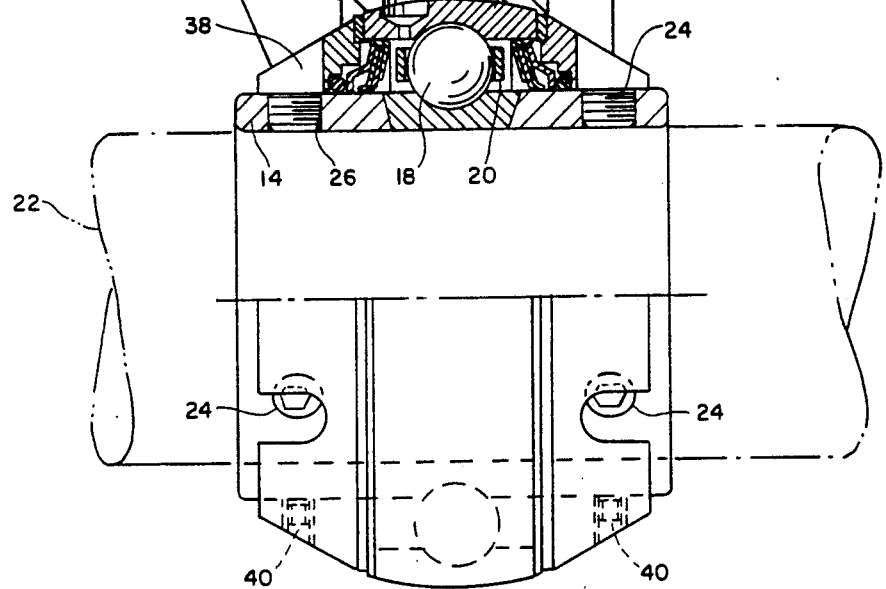
FIG. 2 is an enlarged partial view of the bearing assembly of FIG. 1 showing details of the shield means and its relationship to the bearing races.
Figure 2:
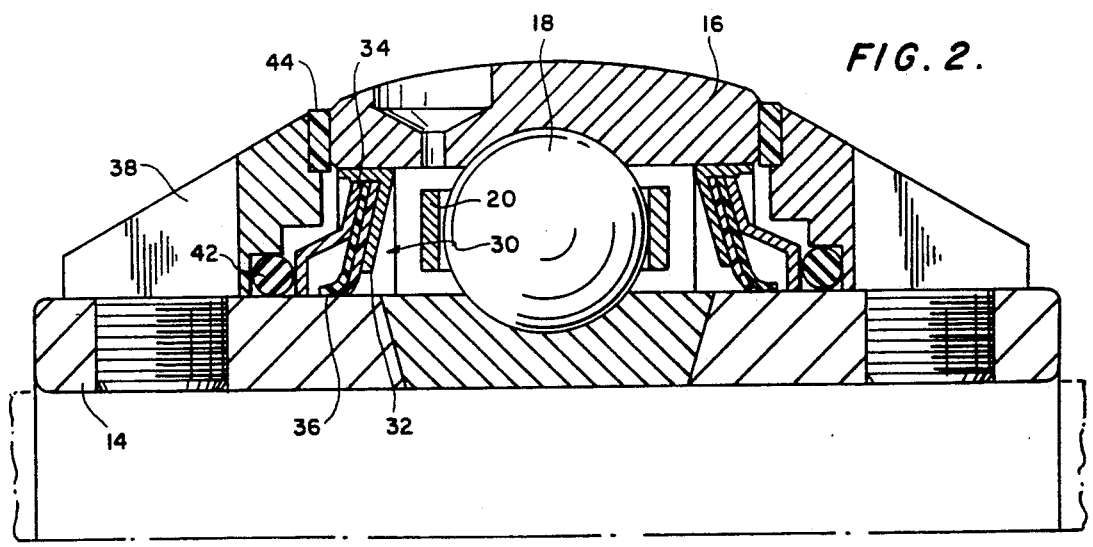
Figure 3:
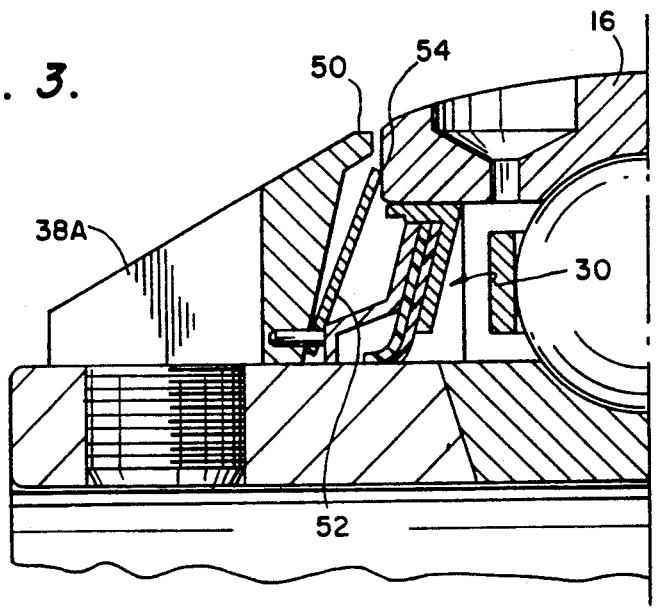
FIG. 3 is a sectional view of a second embodiment of the invention.

In FIG. 3, there is illustrated a second embodiment of the invention which comprises a modified shield 38A, differing from the shield 38 in that there is included an inwardly directed lip 50, which, when assembled in close proximately to the outer race 16, is slightly spaced therefrom. Also, fixed, as being pinned, welded, riveted or otherwise connected, is a Belleville washer or spring washer 52 preloaded against the outer race 16, so that its outer periphery 54 is in frictional contact with the outer race 16. As the periphery 54 wears, the washer compensates for wear because of the preload; thus the washer is self-compensating for wear. The grease seals 30 are essentially the same as illustrated in FIGS. 1 and 2.

Figure 4:
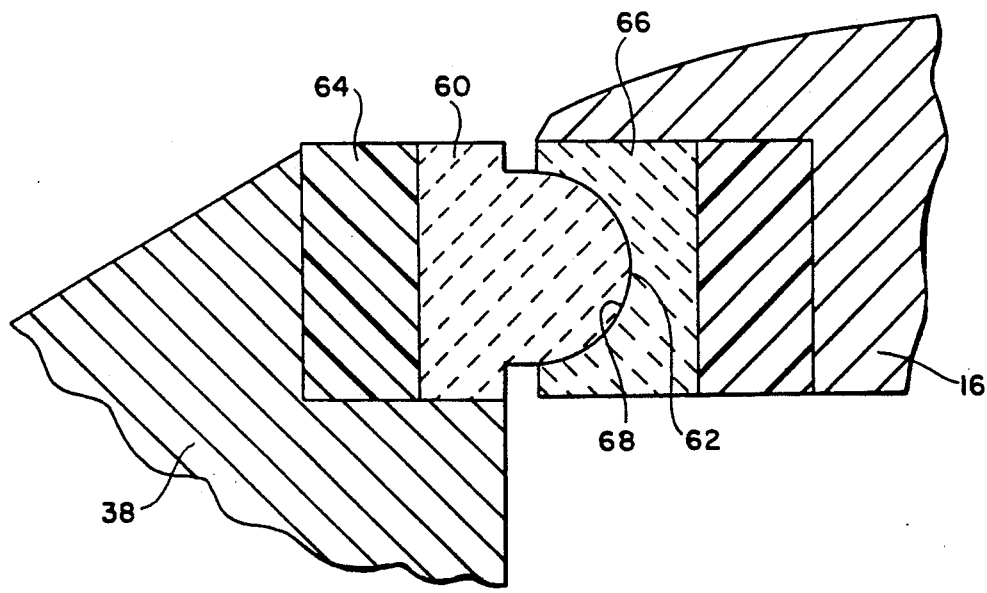
FIG. 4 is a sectional view of still another embodiment of the invention.

FIG. 4, illustrated still another embodiment of the invention. In this embodiment, an assembly of two ceramic parts together with a pair of elastomer members is used. A first ceramic member 60 with a projecting bull-nose portion 62 is connected by an elastomer member 64 to the shiled while a second ceramic member 66 with a complementary concave portion 68 to receive the bull-nose portion 62 is connected to the bearing outer race 16. During assembly, the assembly of ceramic parts is preloaded, thus insuring the seal of the bearing from dirt and other foreign material while permitting the relatively rotation between the shield and the outer race.

The appended claims are to be given the broadest interpretation permitted by the prior art and are intended to cover all equivalents of the structure described herein.

We claim:

1. A bearing assembly comprising:
   a bearing housing having an inner concave surface;
   a bearing shaft;
   an inner race connected to said bearing shaft;
   an outer race spaced radially from said inner race with an outer convex surface complimentary to the surface of said housing and engaging said housing surface;
   anti-friction means between said inner and outer races;
   said races being adaptable to rotate relative to one another;
   said bearing assembly being so constructed and arranged to accommodate misalignment of said shaft and said housing;
   seal means between said inner and outer races for retaining lubricant therebetween and substantially preventing the ingress of dirt and other foreign matter thereinto;
   a shield means connected to said inner race so as to rotate therewith and extending radially outwardly therefrom with a portion axially located opposite said outer race and in contact therewith;
   said shield means being shaped to avoid interference with said housing in the event of shaft misalignment relative to said housing and substantially preventing the ingress of dirt and other foreign material between said shield means and said seal means.

2. A bearing assembly as recited in claim 1, wherein said shield means is located at opposite sides of said bearing assembly.

3. A bearing assembly as recited in claim 1, wherein said shield means is connected to said inner race by one or more set screws.

4. A bearing assembly as recited in claim 1, wherein said shield means is sealed to said inner race by an elastomer O-ring encircling said inner race.

5. A bearing assembly as recited in claim 1, wherein said shield means comprises a first part connected to said shaft and an anti-friction ring of a non-elastomeric material in sealing contact with said first part and with said outer race, said anti-friction ring permitting relative rotation between said first part and said outer race.

6. A bearing assembly as recited in claim 5, wherin said anti-friction ring means comprises a plastic ring, such as TEFLON.

7. A bearing assembly as recited in claim 1, wherein said shield means comprises a body portion connected to said inner race and an upper lip extending axially into close proximity to said outer race and further comprises a spring washer having a radially outer portion frictionally engaging said outer race and a inner portion connected to said body portion of said shield means, said upper lip extending axially over said outer portion of said spring washer, said spring washer being preloaded to insure said frictional contact with said outer race.

8. A bearing assembly comprising:
   a bearing housing;
   a bearing shaft;
   an inner race connected to said bearing shaft;
   an outer race spaced radially from said inner race;
   anti-friction means between said inner and outer races;
   said races being receivable in said housing and being adaptable to rotate relative to one another;
   said bearing being so constructed and arranged to accommodate misalignment of said shaft and said housing;
   seal means between said inner and outer races for retaining lubricant therebetween and substantially preventing the ingress of dirt and other foreign matter thereinto;
   a shield means comprising a pair of ceramic members, one member having a bull-nose portion and the other member having a concave cavity receiving said bull-nose portion, one member being connected to said inner race and another member extending radially outwardly therefrom to a location opposite said outer race and in close proximately thereto.

9. A bearing asembly as recited in claim 8, wherein said ceramic members are resiliently connected, respectively, to said inner race and to said outer race, said ceramic members and said resilient connection permitting misalignment of said bearing relative to said housing and relative rotation between said races.

* * * * *